Oct. 10, 1972          R. L. TRIMBLE          3,697,454
    FOAMED POLYMER PARTICLES OF DISTINCTIVE SHAPE AND
                   METHOD OF MAKING SAME
                    Filed Aug. 27, 1970
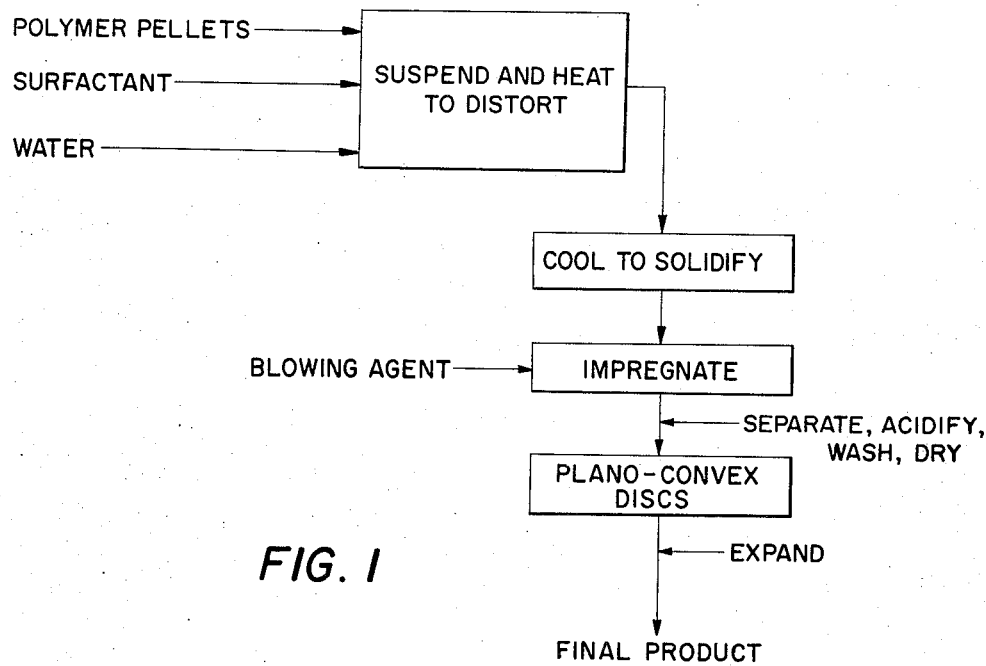
FIG. 1
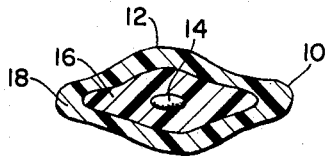
FIG. 2
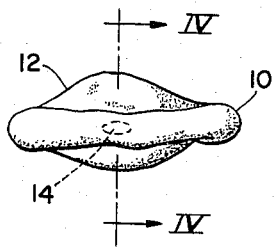
FIG. 3
FIG. 4
INVENTOR.
ROBERT L. TRIMBLE
BY
Hubert E. Evans
Attorney

United States Patent Office 3,697,454
Patented Oct. 10, 1972

3,697,454
FOAMED POLYMER PARTICLES OF DISTINCTIVE SHAPE AND METHOD OF MAKING SAME
Robert L. Trimble, Center Township, Monaca County, Pa., assignor to Sinclair-Koppers Company, Pittsburgh, Pa.
Filed Aug. 27, 1970, Ser. No. 67,304
Int. Cl. C08j 1/14
U.S. Cl. 260—2.5 B                                        6 Claims

ABSTRACT OF THE DISCLOSURE

Foamed particles of thermoplastic polymers and copolymers are prepared by suspension of thermoplastic polymer granules or pellets in an aqueous medium, heating to deform the pellets to plano-convex, disc-shaped beads, impregnating the beads with an organic blowing agent, and expanding the beads to distinctively shaped, foamed particles having a wavy periphery and a generally rounded middle section containing a hard core of unexpanded thermoplastic polymer. The foamed particles have a diameter of about ¾ inch and a flatness index of at least 3.0. The particles are suitable for loose-fill packaging of sensitive or fragile articles.

BACKGROUND OF THE INVENTION

This invention relates generally to the preparation of foamed thermoplastic polymer particles having a distinctive shape suitable as loose-fill packaging material.

It is known from U.S. 3,188,264, to extrude foamable thermoplastic beads into rods having irregular cross sectional configurations and cut off various lengths to form particles having a shape capable of interlocking and suitable for loose-filled packaging materials. U.S. 3,400,037, relates to the extrusion of cylindrical foamed rods which, when cut to short lengths and allowed to warp, form various shapes also suitable for loose-fill packing.

These methods both involve the use of relatively expensive extrusion equipment.

SUMMARY OF THE INVENTION

It has now been found that foamed thermoplastic polymer particles suitable for use as loose-fill packaging material can be prepared without the need for expensive extrusion equipment. Thus commercially available polymer pellets are suspended in aqueous medium, heated to deform the pellets to the shape of plano-convex, disc-shaped beads, impregnated with an organic blowing agent, and expanded by the use of heat to form a distinctively shaped, foam particle having wavy edges, and a generally rounded middle section containing a hard core of unexpanded thermoplastic polymer.

BRIEF DESCRIPTION OF THE DRAWINGS

FIG. 1 is a flow diagram illustrating a typical embodiment of the process of the invention.

FIG. 2 is a side view of the plano-convex, disc-shaped beads after impregnation, but before expansion.

FIG. 3 is a side view of the distinctively shaped foamed polymer particle.

FIG. 4 is a cross-sectional view taken along the line IV—IV in FIG. 3 of the distinctively shaped foamed polymer particle showing the internal structure of the particle.

DETAILED DESCRIPTION OF THE INVENTION

In accordance with this invention, a variety of expandable thermoplastic homopolymers and copolymers can be prepared which are derived from vinyl aromatic monomers including styrene, vinyl-toluene, isopropyl-styrene, p-tert-butylstyrene, alpha-methylstyrene, nuclear methylstyrene, chlorostyrene, etc., as well as copolymers of these with monomers such as butadiene, alkyl methacrylates, alkyl acrylates, and acrylonitrile wherein the vinyl aromatic monomer is present in at least 50% by weight. For the purposes of convenience, these polymers are referred to herein as styrene polymers. The styrene polymers can, of course, be prepared by any of the conventional polymerization techniques.

Possible physical form of the styrene polymers useful in the present invention are granules or particulate pieces of styrene polymer, or even comminuted sheets of such polymer. Preferably styrene polymers in the form of pellets are used. Such pellets are normally available commercially from any of the known manufacturers. Such pellets are normally about ⅛ inch in diameter and cut off at lengths varying from ⅛ to about ¼ inches. Such commercially available pellets are, for example, Dylene 2 or Dylene 8, available from Sinclair-Koppers Company, or Styron 666, available from The Dow Chemical Company.

The granules are suspended in an aqueous medium by means of suitable suspending agent systems to keep the granules from agglomerating at the elevated temperatures employed to deform the granules to disc-shaped beads. Suitable systems are, for example, those inorganic suspending agents described in D'Alelio Pat. U.S. 2,983,692, such as tricalcium phosphate in combination with an anionic surface active agent, and organic suspending agents described in Buchholtz et al., U.S. 2,950,261.

The suspension of granules in water is then heated to a temperature at or above the softening point of the thermoplastic polymer to allow deformation of the granules to a plano-convex, disc-shaped bead having a diameter of about 9/16 inch and a flatness index of at least 3.0. Depending on the polymer used, this temperature should be between 90° and 140° C. The flatness index is obtained by dividing the diameter of the disc portion of the bead by the thickness of the plano-convex portion of the bead. The suspension should be maintained at the deformation temperature for a period of from 3 to 6 hours.

The suspension is then cooled to a temperature of between 40° and 90° C. to allow the disc-shaped beads to solidify somewhat.

The impregnation is conventionally carried out at temperatures ranging from about 80° to 150° C., preferably from 90° C. to 120° C. Increasing the temperature makes the impregnation proceed at a faster rate. Time of impregnation may be varied from 3 to 10 hours. The longer times serve to allow the blowing agent to penetrate more thoroughly into the beads.

The blowing agents are compounds which were normally liquid but will produce gases on heating. Preferred blowing agents include aliphatic hydrocarbons containing from 1–7 carbon atoms in the molecule, for example, petroleum ether or methane, ethane, propane, butane, pentane, hexane, heptane, cyclohexane, isopentane and their halogenated derivatives which boil at a temperature below the softening point of the polymer. The agents are normally used in amounts between 5 and 9 percent by weight of the polymer particles.

The impregnated beads are separated from the aqueous phase after cooling to at least 40° C., washed with hydrochloric acid, rinsed with water, and dried. Impregnation leaves the disc-shaped beads essentially unchanged in shape. One such bead is shown in FIG. 2 of the drawing.

Expansion of the plano-convex, disc-shaped beads to the final loose-packaging shape is accomplished by heating the beads in equipment designed for the pre-expansion of foamable polymers. Such equipment may be, for example, the preexpander described in Rodman, U.S. 3,023,175, or Adams et al., U.S. 3,494,988.

Heating in the preexpander is normally accomplished by means of steam, although other means, such as radiant heat or burners below the expander are also effective. Expansion is usually carried out at temperatures between about 80 and 120° C. The desired temperature is normally above the boiling point of the blowing agent and at or slightly above the softening point of polymer. If the temperature is too low, the expansion is incomplete. Too high a temperature causes the expanded particles to collapse and shrivel. The resulting foamed polymer particles have a distinctive shape as illustrated in FIGS. 3 and 4 of the drawings. Thus, the particles have a wavy periphery 10 with a generally rounded middle section 12 containing a hard core 14 of unexpanded thermoplastic polymer, usually surrounded by a soft, dense portion 16 and a softer, less dense portion 18.

The invention is further illustrated by the flow diagram of FIG. 1 of the drawing and by the following examples wherein parts are parts by weight unless otherwise indicated.

EXAMPLE I

To a kettle equipped with a stirrer was added 100 parts of water, 2 parts of tricalcium phosphate as dispersing agent, 0.05 part of sodium dodecylbenzene sulfonate as anionic surface-active agent, and 100 parts polystyrene pellets (Sinclair-Koppers Company Dylene 8G crystal pellets). The mixture was heated with stirring to a temperature of 140° C. over a period of one and one-half hours. The suspension was maintained at 140° C. for 4 hours to deform the pellets to a plano-convex, disc-shaped bead. The reactor was then cooled to approximately 60° C. to allow the beads to solidify in the flattened shape. The mixture was then heated to 90° C. and 9 parts n-pentane added over a period of 4 hours. The whole was maintained at 90° C. for an additional 3 hours to allow the beads to become impregnated with the pentane. The reactor was then cooled to 40° C., dumped to separate the impregnated beads, which were then acidified with dilute hydrochloric acid solution, washed free of acid, and dried. The beads were plano-convex, disc-shaped beads having a diameter of about 3/16 inch, a flatness index of about 3.0 and contained 5.44 percent n-pentane.

The beads so obtained were placed in a preexpander, such as the Rodman preexpander described in U.S. Pat. 3,023,175, and heated with steam at a pressure of 14 p.s.i.g. and at a rate of 250 lbs./hr. The expanded particles had a wavy periphery with a generally rounded middle section containing a hard core of unexpanded polystyrene. The overall size of the expanded particles was about 3/4 inch in diameter with a flatness index of about 3.0. These particles are especially useful as loose-fill packaging material since their shape generally allows intimate packing of the particles, while the hardcore central area provides a degree of resilience desirable for absorbing shock from handling of the package.

EXAMPLE II

To a kettle equipped with a stirrer was added 100 parts of water, 100 parts polystyrene pellets, 2.0 parts tricalcium phosphate and 0.05 part of sodium dodecylbenzene sulfonate. The mixture was heated to 140° C. and maintained with stirring for 4 hours. The reactor was cooled to 90° C., after which 11 parts n-pentane was added and the solution maintained at 90° C. with stirring for an additional 6 hours. The reactor was then cooled to 40° C., and the impregnated beads were separated, acidified with hydrochloric acid, washed with water, and dried at 35-38° C. The beads were plano-convex, disc-shaped beads having a diameter of about 3/16 inch, a flatness index of about 3.0, and contained 7.1 percent n-pentane. On expansion, the foamed particles had a wavy perimeter with a generally rounded middle section containing a hard core of unexpanded polystyrene. The foamed particles had an average diameter of about 3/4 inch and a flatness index of about 2.5–3.5.

EXAMPLE III

To a reactor equipped with a stirrer was added 30 parts polystyrene pellets (Sinclair-Koppers Company Dylene 2), 30 parts water, 0.05 part sodium dodecylbenzene sulfonate, and 2.0 parts tricalcium phosphate. The reactor was heated to 90° C. for several hours. The reactor temperature was raised to 95° C. and the addition of 12 parts n-pentane was then begun and continued over a period of 10 hours. The reactor was maintained at 95° C. for an additional hour, after which the suspension was cooled to 30° C., the plano-convex beads separated, washed with acid and then with water, and dried. The resulting impregnated beads were as in Example I and II and had a pentane content of 8.1 percent. Expansion of the beads gave the desired distinctively shaped particles.

What is claimed is:

1. A process for the preparation of irregularly shaped foamed thermoplastic polymer loose-fill packaging particles comprising:
    (a) suspending thermoplastic polymer granules in an aqueous medium consisting essentially of an inorganic suspending agent in combination with an anionic surface active agent in water;
    (b) heating the resulting suspension to a temperature of between 90 and 140° C. to deform the granules to a plano-convex, disc-shaped bead having a diameter of about 3/16 inch and a flatness index of at least 3.0;
    (c) cooling the suspension to a temperature of between 40° and 90° C. to allow said disc-shaped beads to attain a permanent structure;
    (d) adding a normally liquid expanding agent to impregnate said disc-shaped beads;
    (e) separating said impregnated beads from the aqueous phase; and
    (f) expanding said impregnated beads at a temperature of between 80 and 120° C., to obtain the desired foamed packaging particles having wavy peripheries with a generally rounded middle section containing hard cores of unexpanded thermoplastic polymer surrounded by a soft, dense portions and softer, less dense portions; said particles having a diameter of about 3/4 inch and a flatness index of at least 3.0.

2. A process for the preparation of foamable thermoplastic polymer beads having a plano-convex, disc-like shape comprising:
    (a) suspending thermoplastic polymer granules in an aqueous medium consisting essentially of an inorganic suspending agent in combination with an anionic surface active agent in water;
    (b) heating the resulting suspension to a temperature of between 90 and 140° C. to deform the granules to a plano-convex, disc-shaped bead having a diameter of about 3/16 inch and a flatness index of at least 3.0;
    (c) cooling the suspension to a temperature of between 40° and 90° C. to allow said disc-shaped beads to attain a permanent structure;
    (d) adding a normally liquid expanding agent to impregnate said disc-shaped beads; and
    (e) separating said impregnated beads from the aqueous phase;

to obtain impregnated beads which upon expansion by heat produce foamed packaging particles.

3. The process of claim 1 wherein said thermoplastic polymer is polystyrene.

4. The process of claim 1 wherein said normally liquid expanding agent is n-pentane.

5. A foamed thermoplastic polymer particle having a wavy periphery with a generally rounded middle section containing a hard core of unexpanded thermoplastic polymer surrounded by a soft, dense portion and a softer, less dense portion; said particle having a diameter of about ¾ inch and a flatness index of at least 3.0.

6. The particle of claim 5 wherein said thermoplastic polymer is polystyrene.

References Cited
UNITED STATES PATENTS

| | | | |
|---|---|---|---|
| 3,222,343 | 12/1965 | Ingram | 260—2.5 B |
| 3,342,760 | 9/1967 | Rode | 260—2.5 B |

SAMUEL H. BLECH, Primary Examiner

M. FOELAK, Assistant Examiner

U.S. Cl. X.R.

206—46 FC; 229—14 C